United States Patent
Chu

(10) Patent No.: US 10,503,360 B2
(45) Date of Patent: Dec. 10, 2019

(54) SYSTEM AND METHOD FOR ADAPTIVE CONTROL AND ANNOTATION INTERFACE

(71) Applicant: Roy Chu, Irvine, CA (US)

(72) Inventor: Roy Chu, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 568 days.

(21) Appl. No.: 14/953,497

(22) Filed: Nov. 30, 2015

(65) Prior Publication Data

US 2017/0153771 A1    Jun. 1, 2017

(51) Int. Cl.

| | |
|---|---|
| *G06F 3/048* | (2013.01) |
| *G06F 3/0482* | (2013.01) |
| *G06F 17/24* | (2006.01) |
| *G06F 3/0489* | (2013.01) |
| *G06F 3/0484* | (2013.01) |

(52) U.S. Cl.
CPC ........ *G06F 3/0482* (2013.01); *G06F 3/04847* (2013.01); *G06F 3/04895* (2013.01); *G06F 17/241* (2013.01); *G06F 2203/04807* (2013.01)

(58) Field of Classification Search
CPC . G06F 3/00; G06F 3/017; G06F 3/033; G06F 3/041; G06F 3/048; G06F 3/0481; G06F 3/0482; G06F 3/0484; G06F 3/0488; G06F 3/04812; G06F 3/04842; G06F 17/24; G06F 17/241
See application file for complete search history.

(56) References Cited

U.S. PATENT DOCUMENTS

| | | | | |
|---|---|---|---|---|
| 5,805,167 A | * | 9/1998 | van Cruyningen | ... G06F 3/0482 715/808 |
| 7,246,329 B1 | * | 7/2007 | Miura | ... G06F 3/0482 715/764 |
| 8,869,068 B2 | * | 10/2014 | Primiani | ... G06F 3/048 715/810 |
| 9,829,987 B2 | * | 11/2017 | Bandt-Horn | ... G06F 3/0202 |

(Continued)

FOREIGN PATENT DOCUMENTS

JP   2005107963   *   4/2005   ............... G06F 3/00

OTHER PUBLICATIONS

JP2005107963; Machine Translation; Apr. 21, 20115.*

*Primary Examiner* — Xiomara L Bautista

(57) ABSTRACT

Disclosed is an adaptive control and annotation GUI that simplifies user interfaces for activating a plurality of user input options, reduces data entry labor overhead, and improves the ability of the computer to display information and interact with the user. This may be accomplished by folding multiple user objectives into concise natural visual-logical representations and actions with self-evident and predictable behavioral rules, reducing the number of user options displayed to the user, providing a plurality of user options, reducing the number of user actions required within a user interaction, simplifying the orientation and display of user options, customizing appearances of user options displayed to be more intuitive to the user, coupling different types of data, customizing the display of user options so the displayed user options are more relevant to the task and workflow being performed by the user, or updating multiple auxiliary information displays within the computer in response to user actions.

20 Claims, 11 Drawing Sheets

(56) References Cited

U.S. PATENT DOCUMENTS

| | | | | |
|---|---|---|---|---|
| 2002/0175955 | A1* | 11/2002 | Gourdol | G06F 3/0482 |
| | | | | 715/821 |
| 2004/0263475 | A1* | 12/2004 | Wecker | G06F 3/04812 |
| | | | | 345/157 |
| 2006/0080214 | A1* | 4/2006 | Hausman | G06Q 40/00 |
| | | | | 705/37 |
| 2006/0095865 | A1* | 5/2006 | Rostom | G06F 3/0482 |
| | | | | 715/810 |
| 2008/0222569 | A1* | 9/2008 | Champion | G06F 3/0482 |
| | | | | 715/834 |
| 2009/0007012 | A1* | 1/2009 | Mandic | G06F 3/0481 |
| | | | | 715/810 |
| 2009/0027337 | A1* | 1/2009 | Hildreth | G06F 3/011 |
| | | | | 345/158 |
| 2009/0327963 | A1* | 12/2009 | Mouilleseaux | G06F 3/0482 |
| | | | | 715/834 |
| 2010/0100849 | A1* | 4/2010 | Fram | G06F 3/0236 |
| | | | | 715/835 |
| 2010/0122194 | A1* | 5/2010 | Rogers | G06F 3/04817 |
| | | | | 715/769 |
| 2010/0306702 | A1* | 12/2010 | Warner | G06F 3/0482 |
| | | | | 715/811 |
| 2011/0055754 | A1* | 3/2011 | Nicholas, III | G06F 3/0481 |
| | | | | 715/810 |
| 2014/0380223 | A1* | 12/2014 | Counsell | G06F 3/017 |
| | | | | 715/773 |
| 2016/0132119 | A1* | 5/2016 | Temple | G06F 3/017 |
| | | | | 345/168 |
| 2017/0038926 | A1* | 2/2017 | Fram | G06F 3/0487 |

\* cited by examiner

SYSTEM AND METHOD FOR ADAPTIVE CONTROL AND ANNOTATION INTERFACE

FIELD OF THE DISCLOSURE

The subject matter disclosed herein generally relates to a graphical user interface (GUI) and, more specifically, to a system and method for improving usability and user experience by reducing labor overhead of data processes by providing a cohesive adaptive control and annotation interface.

BACKGROUND

When presented in the context of a GUI, conventional data entry processes often provide an abundance of input options that are often ill-suited or confusing, thereby rendering the data entry processes inefficient and non-intuitive. These common existing input options are often superficial, lacking meaning or defined information relationships, and presented generically with minimal hierarchical or semantic organization. The result is redundant or disjointed without adequate visual cohesion, usually prioritizing visual display pixel space for condensing content at the expense of effectively communicating information or conveying intent and instructional use. Moreover, excessive input options also inhibit the usability of the data entry program by impairing data selection, control, and viewing work processes. Many input options are tedious and singularly tailored for a specific type or a narrow scope of data, and when used in aggregate, may create a dissonant and confusing interface, negatively impacting usability, user experience, and work productivity.

For example, FIG. 1 illustrates an example of a GUI for a program designed to capture patient records. The GUI provides numerous input options via icons 102 located along a ribbon 104 at the top of a page 100, menu options 106 located above the ribbon 104, and buttons 108 and a drop-down menu 110 located along the side of the page 100. When inputting data into one or more of the input fields 112, a user typically navigates the icons 102, menu options 106, buttons 108, and drop-down menu 110 to actuate a user state and/or locate their desired options for properly inputting, formatting, and/or modifying the input data. Because many of the user options presented on the page are unclear (visually or semantically), procedurally lengthy in a rigmarole-like fashion, demanding of precise user interaction of relatively small area pixel fields on a visual display, which requires physical and visual-coordinated precision and focus by the user to actuate the identified interface element), redundant, or otherwise inconvenient or confusing, the data entry process becomes cognitively distracting, mentally-taxing, inefficient, and non-intuitive. What's more, as a user navigates the many input options, the user is likely to select unintended user options, which disrupts the user workflow specific to the user's respective domain of knowledge and domain expertise, disrupts the data entry process, and creates a likelihood for input and data entry errors. This may have additional repercussions or ramifications.

Some programs attempt to reduce the input options presented to a user by providing various tabs, menus, and submenus that a user navigates to find a desired input option. This solution, however, requires the user to expend significant time navigating the tabs, menus, and submenus to locate a particular input option. This solution is undesirable to the user because it requires the user to shift their focus from the task at hand (the task associated with their initial need and motivation for using the program) to the task of navigating the overwhelmingly numerous tabs, menus, and submenus to locate the desired input option. Moreover, once the desired input option is located, the user must expend additional cognitive effort to understand how to properly use the input tooling, which may not always be obvious and may incur multiple and laborious additional steps to actuate the targeted input option or to input data because implementations are not always uniform or consistent. Because navigating the tabs, menus, and submenus is often a burdensome and confusing task with opaque instructional information for use, unintended or incorrect selections are frequently made as the user searches for their desired input option if the user may find the desired input option at all, and consequently, user productivity suffers.

SUMMARY

The systems and methods described herein resolve the issues described above and may also provide any number of additional or alternative benefits. For example, the systems and methods may simplify a user interface for selecting various user input options, and improve the ability for the computer to display information and interact with the user. These improvements may be accomplished by folding several user objectives into concise natural visual-logical representations and actions with self-evident and predictable behavioral rules, reducing the number of user options displayed to the user, simplifying the orientation and display of user options, customizing the appearances of the user options displayed so that they are more intuitive to the user (e.g., using a graphical representation of the user option rather than a textual representation of the user option), customizing the display of user options so that the displayed user options are responsive and determined dynamically to be relevant to the task being performed by the user, removing the user interaction constraints within the overall visual display (e.g., allowing interface and program actuation beyond a limited set of input areas and fields).

In one embodiment, a computer-implemented method for generating a graphical user interface comprises identifying, by a computer, a data input field based on coordinates of pixels associated with a location of a cursor on the graphical user interface; determining, by the computer, one or more user options associated with the identified data input field; displaying, by the computer, a menu comprising the one or more user options positioned circumferentially around a point of origin located proximate the cursor based on contextual information of the point of origin and the graphical user interface; receiving, by the computer, parametric data comprising vector data indicative of a displacement angle and displacement distance of the cursor with respect to the point of origin; determining, by the computer, whether one of the displayed user options was selected by a user, the determination based on the vector data; and based on determining that one of the displayed user options was selected by the user, executing, by the computer, the selected user option. Optionally, the computer can be configured to generate a plurality of meta and parametric data to drive additional program activity.

In another embodiment, a computer-implemented method for modifying a graphical user interface comprises identifying, by a computer, a data input field based on a location of a cursor on the graphical user interface; determining, by the computer, one or more user options associated with the identified data input field based on contextual information of the location of the cursor and the graphical user interface;

displaying, by the computer, a menu comprising one or more menu fields positioned circumferentially around a point of origin located proximate the cursor, each of the menu fields containing one of the one or more user options; receiving, at the computer, parametric data comprising vector data indicative of a displacement angle and displacement distance of the cursor with respect to a location of the cursor when the menu is displayed; determining, by the computer, whether one of the user options contained in one of the menu fields was selected by a user, the determination based on the vector data; and based on determining that one of the user options contained in one of the menu fields was selected by the user, executing, by the computer, the selected user option.

In yet another embodiment, a system for providing a graphical user interface comprises a computer configured to execute one or more graphical user interfaces corresponding to one or more records of data input fields and one or more records of user options in a data store, wherein executing the one or more graphical user interfaces comprises: identifying one of the data input fields based on coordinates of pixels associated with a location of a cursor, determining the one or more user options associated with the identified data input field, executing one of the graphical user interfaces to display a menu comprising the one or more user options associated with the identified data input field, wherein the one or more user options are displayed circumferentially around a point of origin located proximate the cursor; receiving vector data indicative of a displacement angle and displacement distance of the cursor with respect to the point of origin; determining whether one of the displayed user options was selected by a user, the determination based on the vector data; and based on determining that one of the displayed user options was selected by the user, executing the selected user option.

It is to be understood that both the foregoing general description and the following detailed description are exemplary and explanatory and are intended to provide further explanation of the invention as claimed. The foregoing and other features and advantages of the present disclosure will become further apparent from the following detailed description of the embodiments, read in conjunction with the accompanying drawings. The detailed description and drawings are merely illustrative of the disclosure, rather than limiting the scope of the invention as defined by the appended claims and equivalents thereof.

BRIEF DESCRIPTION OF THE DRAWINGS

The accompanying drawings constitute a part of this specification, illustrate one or more embodiments of the invention, and together with the rest of the specification, explain the invention.

DETAILED DESCRIPTION

Figure 1:
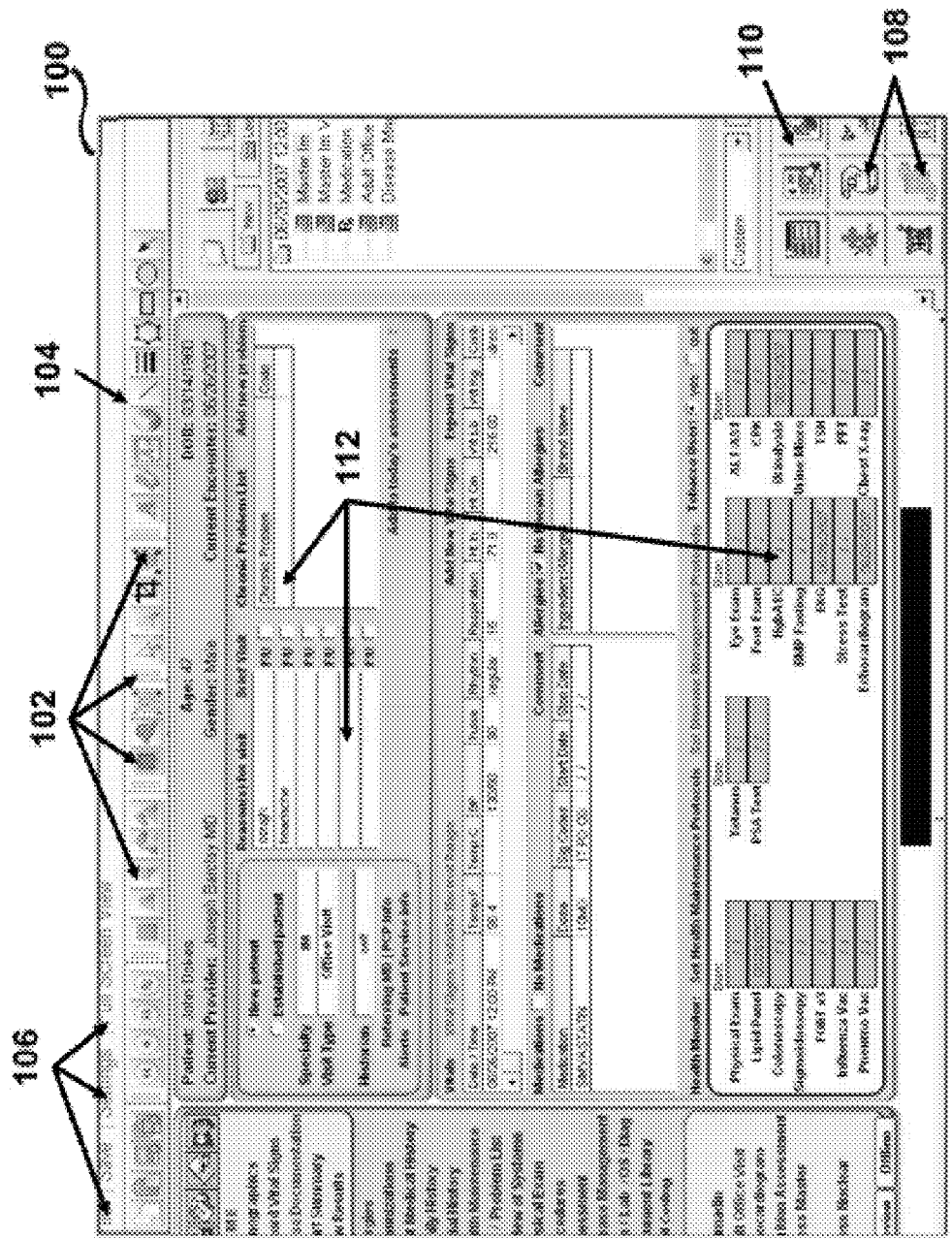
FIG. 1 illustrates an example of a GUI for a program designed to capture patient records.

The present disclosure is generally described in detail with reference to embodiments illustrated in the drawings. However, other embodiments may be used and/or other changes may be made without departing from the spirit or scope of the present disclosure. The illustrative embodiments described in the detailed description are not meant to be limiting of the subject matter presented herein.

Reference will now be made to the exemplary embodiments illustrated in the drawings, and specific language will be used to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Embodiments of the present disclosure relate to methods, systems, and computer storage media having computer-executable instructions embodied therein that, when executed, perform methods in accordance with embodiments hereof, for providing an adaptive control and annotation GUI. The GUI simplifies the user interface for selecting various user input options, reduces the labor overhead of the user and improves the ability of the processing units to display information and interact with the user. This may be accomplished in some embodiments by reducing the number of user options displayed to the user, simplifying the orientation and display of user options, customizing the appearances of the user options displayed so that they are more intuitive to the user (e,g., using a graphical representation of the user option rather than a textual representation of the user option), customizing the display of user options so that the displayed user options are relevant to the task being performed by the user, or by otherwise representing the user options in a manner that reduces labor overhead burdening the processing units operating the data entry program or improves the ability of the processing units to display information and interact with the user.

Accordingly, in one aspect, embodiments of the present disclosure relate to a computer-implemented method for modifying a GUI, according to user inputs. In one embodiment, a computer-implemented method for generating a graphical user interface comprises identifying, by a computer, a data input field based on coordinates of pixels associated with a location of a cursor on the graphical user interface; determining, by the computer, one or more user options associated with the identified data input field; displaying, by the computer, a menu comprising the one or more user options positioned circumferentially around a point of origin located proximate the cursor based on contextual information of the point of origin and the graphical user interface; receiving, by the computer, parametric data comprising vector data indicative of a displacement angle and displacement distance of the cursor with respect to the point of origin; determining, by the computer, whether one of the displayed user options was selected by a user, the determination based on the vector data; and based on determining that one of the displayed user options was selected by the user, executing, by the computer, the selected user option. Optionally, the computer can be configured to generate a plurality of meta and parametric data to drive additional program activity.

In another aspect, a computer-implemented method for modifying a graphical user interface comprises identifying, by a computer, a data input field based on a location of a cursor on the graphical user interface; determining, by the computer, one or more user options associated with the identified data input field based on contextual information of the location of the cursor and the graphical user interface; displaying, by the computer, a menu comprising one or more menu fields positioned circumferentially around a point of origin located proximate the cursor, each of the menu fields containing one of the one or more user options; receiving, at the computer, parametric data comprising vector data indicative of a displacement angle and displacement distance of the cursor with respect to a location of the cursor when the menu is displayed; determining, by the computer, whether one of the user options contained in one of the menu fields was selected by a user, the determination based on the vector data; and based on determining that one of the user options contained in one of the menu fields was selected by the user, executing, by the computer, the selected user option.

In yet another aspect, a system for providing a graphical user interface comprises a computer configured to execute one or more graphical user interfaces corresponding to one or more records of data input fields and one or more records of user options in a data store, wherein executing the one or more graphical user interfaces comprises: identifying one of the data input fields based on coordinates of pixels associated with a location of a cursor, determining the one or more user options associated with the identified data input field, executing one of the graphical user interfaces to display a menu comprising the one or more user options associated with the identified data input field, wherein the one or more user options are displayed circumferentially around a point of origin located proximate the cursor; receiving vector data indicative of a displacement angle and displacement distance of the cursor with respect to the point of origin; determining whether one of the displayed user options was selected by a user, the determination based on the vector data; and based on determining that one of the displayed user options was selected by the user, executing the selected user option.

As used herein, the term "data input field" should be understood to be any type of data field that receives, contains, displays, or is otherwise associated with the input data. The data input field may also include metadata. "Input data" is data received by, contained within, displayed by, or is otherwise associated with the data input field, and that is intended to be provided by or modified by at least one of the user options. For example, the data input field may include, but is not limited to, a text box, drop-down menu, an object, and the like. Input data may include, but is not limited to, text, objects, images, formatting, and the like. Input actions can include clicking, force touching, tapping, pressing, and the like.

Having briefly described an overview of embodiments of the present disclosure, an exemplary operating environment implementing various aspects of the present disclosure is described below.

Figure 2:
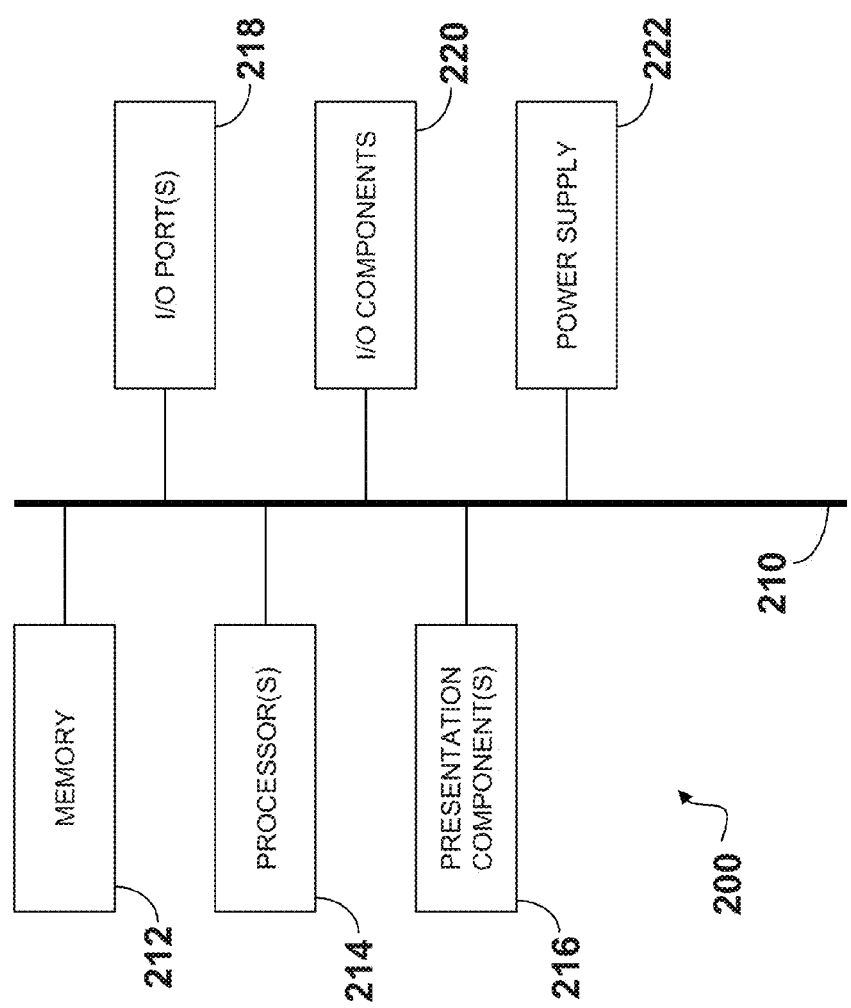
FIG. 2 illustrates a block diagram of an exemplary computing environment for implementing embodiments of the present disclosure.

Referring to the drawings in general, and initially to FIG. 2 in particular, an exemplary operating environment for implementing embodiments of the present disclosure is shown and designated generally as computing device 200. Computing device 200 is but one example of a suitable computing environment and is not intended to suggest any limitation as to the scope of use or functionality of the present disclosure. Neither should the computing environment 200 be interpreted as having any dependency or requirement relating to any one or combination of components illustrated.

The present disclosure may be described in the general context of computer code or machine-useable instructions, including computer-executable instructions such as program components, being executed by a computer or other machine, such as a personal data assistant, smartphone, tablet, or other such devices. Generally, program components including routines, programs, objects, components, data structures, and the like, refer to code that performs particular tasks, or implement particular abstract data types. Embodiments of the present disclosure may be practiced in a variety of system configurations, including hand-held devices, consumer electronics, general-purpose computers, specialty computing devices, etc. Embodiments of the present disclosure may also be practiced in distributed computing environments where tasks are performed by remote-processing devices that are linked through a communications network.

With continued reference to FIG. 2, computing device 200 includes a bus 210 that directly or indirectly couples the following devices: memory 212, one or more processors 214, one or more presentation components 216, input/output (I/O) ports 218, I/O components 220, and a power supply 222. Bus 210 represents what may be one or more busses (such as an address bus, data bus, or combination thereof). Although the various blocks of FIG. 2 are shown with lines for the sake of clarity, in reality, delineating various components is not so clear. That is, the various components of FIG. 2 may be integrated into a single component, or the various components FIG. 2 may be parsed into any number of additional components. For example, in some circumstances a presentation component 216, such as a display device, may be an I/O component 220. Likewise, in some instances, a processor 214 may comprise memory 212. As such, it should be appreciated that the diagram of FIG. 2 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 2 and reference to "computer," "computer device," "computing device," and other similar terms known to one of ordinary skill in the art.

Computing device 200 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 200.

Memory 212 (also referred to herein as a database) includes computer storage media in the form of volatile and/or nonvolatile memory. The memory may be removable, non-removable, or a combination thereof. Exemplary hardware devices include solid-state memory, hard drives, optical-disc drives, etc. Computing device 200 includes one or more processors that read data from various entities such as memory 212 or I/O components 220. Presentation components 216 present data indications to a user or other device. Exemplary presentation components 216 may include a display device (also referred to as a visual display), speaker, printing component, and haptic-feedback component, among others. I/O ports 218 allow computing device 200 to be logically coupled to other devices including I/O components 220, some of which may be built-in illustrative components include a microphone, joystick, game pad, satellite dish, scanner, printer, wireless device, mouse, keyboard, and touchscreen components, among others.

Figure 3:
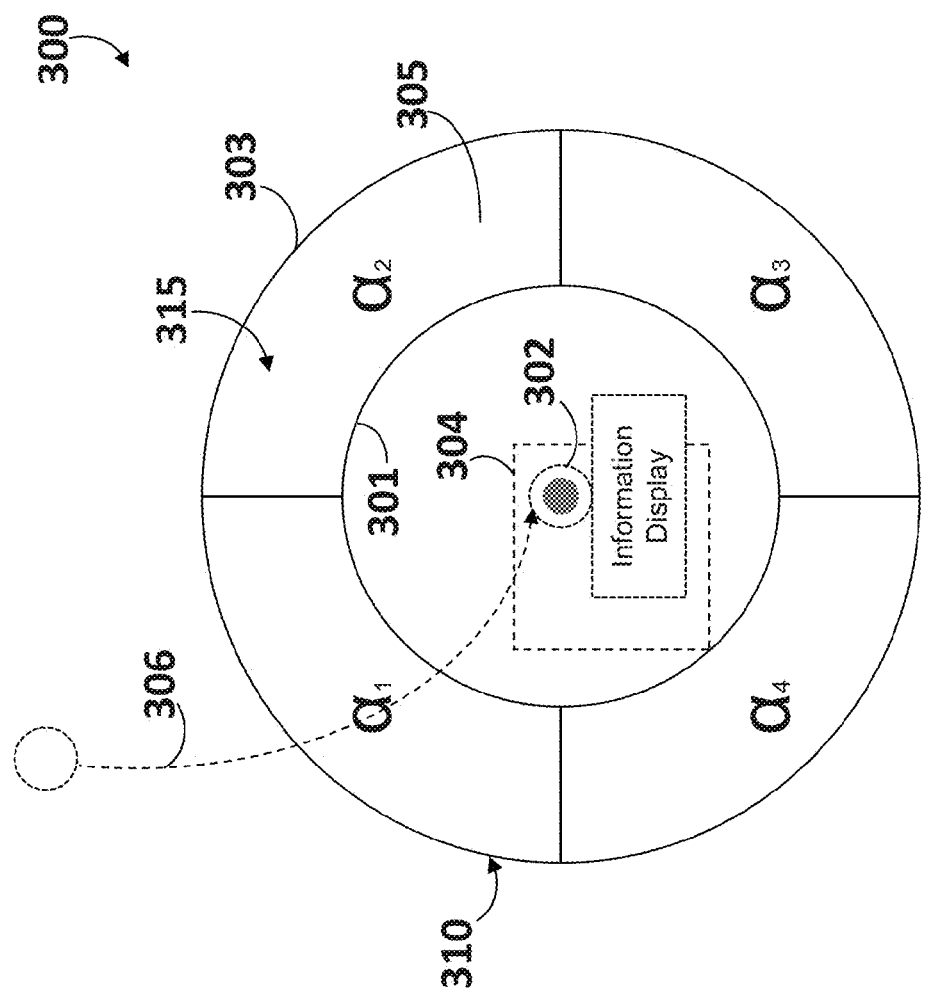
FIG. 3 illustrates an example of a GUI having a menu generated in accordance with an embodiment of the present disclosure.

Reference is now made to FIG. 3, which illustrates an example embodiment of a GUI 300 providing a menu 310 generated in accordance with an embodiment of the present disclosure. The GUI 300 illustrated in FIG. 3 is provided to overcome the deficiencies discussed above with respect to conventional GUIs provided in data entry applications. For example, in some embodiments the GUI 300 simplifies the user interface for selecting various user input options, reduces the labor overhead that burdens user, and improves the ability of the computer to display responsive information and interact with the user. This may be accomplished by reducing the number of user options displayed to the user, simplifying the orientation and display of user options, customizing the appearances of the user options displayed so that they are more intuitive to the user (e.g., using a graphical representation of the user option rather than a textual representation of the user option), customizing the display of user options so that the displayed user options are relevant to the task being performed by the user, or by otherwise representing the user options in a manner that reduces labor overhead burdening the user operating the data entry program or improves the ability of the computer to display responsive information and interact with the user.

As shown in FIG. 3, the GUI 300 includes a menu 310 that generally comprises a concentric or radial shape having an inner circle 301 and an outer circle 303. Within the concentric shape, one or more menu-fields 315 may be displayed between the inner circle 301 and outer circle 303 in a circumferential orientation around a point of origin (not shown) located at or near a cursor 302. Each menu field 315 contains a user option 305. In FIG. 3, the example menu 310 provides four menu fields 315 and four user options 305, namely, α1, α2, α3, and α4, wherein each one of the user options 305 are displayed within one of the menu fields 315. The user options 305 illustrated in FIG. 3 are shown generically, but examples of user options 305 may include number fields, font types, formatting options, an exit option for closing the menu 310, or any other user option associated with the data input field 304. For example, if the data input field 304 is a date of birth, user options 305 may include months, days of the month, or years. As another example, if the data input field 304 is a graphical representation of a patient's leg, the user options 305 may include various graphical options such as, for example, a picture of a heart to represent user options relating to the circulatory system, a picture of a bone to represent user options relating to the bones comprising the leg, or other such graphical or textual options. In one embodiment, the graphical user interface can have a terminal option for which no additional dependent interfaces are generated.

As shown in FIG. 3, the menu 310 is generally centered around a cursor 302 so that the user may conveniently select one of the user options 305 by moving the cursor 302 in the direction of the desired user option 305. It should be appreciated, however, that the menu 310 may be centered around other locations or objects such as, for example, the data input field 304. It should also he appreciated that the menu 310 may be a concentric or radial shape other than a circle. For example, the shape may comprise a rectangular shape, a triangular shape, hexagonal shape, or any other shape.

Figure 4:
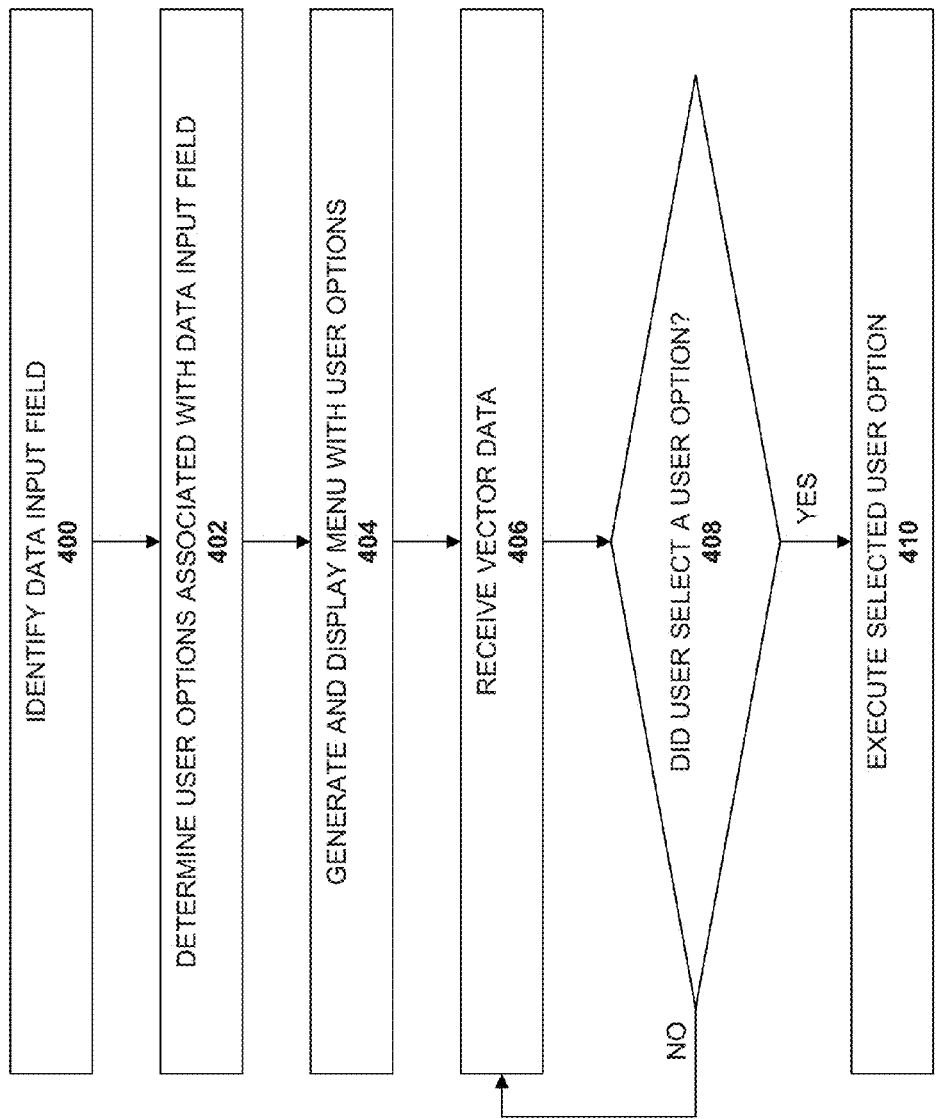
FIG. 4 illustrates a flow diagram of a computer-implemented method for modifying a GUI in accordance with an embodiment of the present disclosure.
Figure 5:
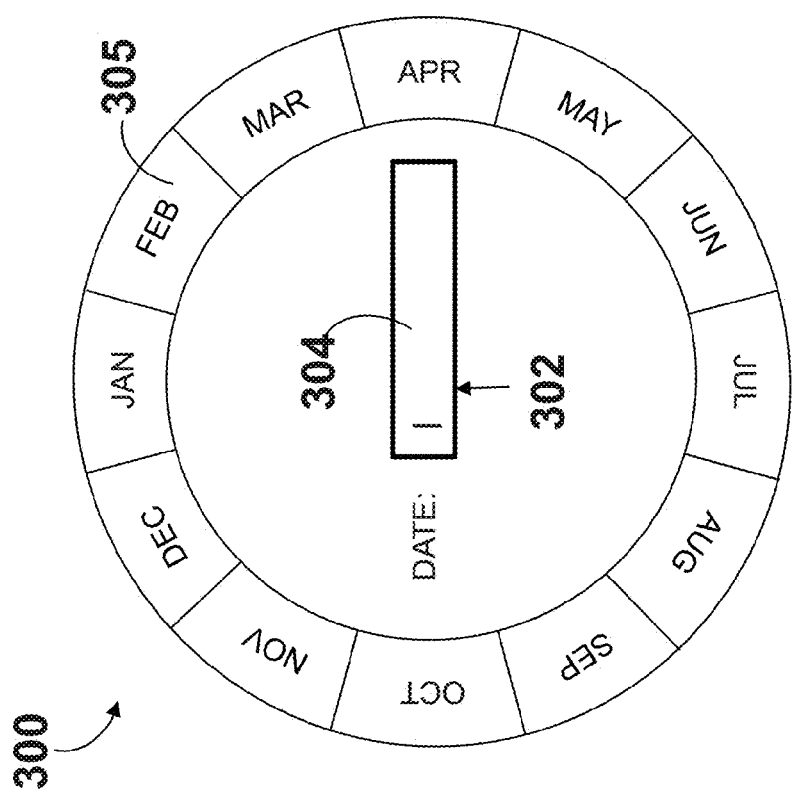
FIG. 5 illustrates an example of the GUI having a menu illustrating months as user options.

Referring now to FIG. 4, a flow diagram is provided to illustrate an embodiment of a computer-implemented method for modifying a graphical user interface in accordance with the present disclosure. The following discussion of the flow diagram in FIG. 4 is provided with reference to the exemplary GUI 300 illustrated in FIG. 3 and the computing device 200 illustrated in FIG. 2.

At step 400, the computer processor 214 identifies a data input field 304. For example, in some embodiments, the processor 214 may receive metadata that identifies the data input field 304. This may occur, for example, when the user clicks the cursor 302 on the data input field 304 or even when the cursor 302 is moved over the data input field 304 as represented by the dashed arrow 306 shown in FIG. 3. The location of the cursor 302 may be determined based on coordinates of pixels associated with the display of the cursor 302 on the GUI 300. In some embodiments, the location of the cursor 302 or the identification of the data input field 304 may be determined based on the location of a user touch on a touchscreen. It should be appreciated that the cursor 302 may be moved by a hardware input, such as the user's mouse, or by a user touch such as on a touchscreen device.

Once the data input field 304 is identified, the processor 214 determines, in step 402, one or more user options 305 that are associated with the identified data input field 304. For example, in some embodiments, the processor 214 may retrieve, from a data table stored in memory 212, a listing of user options 305 that are associated with the data input field 304 identified in step 400. For example, if the data input field 304 is a date, then the data table stored in memory 212 may include a listing of months associated with the date data input field 304. Thus, the user options 305 selected by the processor 214 for display on the visual display 216 may include the months provided in the data table.

It should be appreciated that, in some embodiments, the data table may comprise multiple layers, wherein each subsequent layer is associated with one of the user options provided in the previous layer, :For example, to continue with the date example discussed herein, the data table associated with a date data input field may include a first layer containing a listing of months, and subsequent layers each containing a listing of numbers associated with the number of days in the months provided in the previous layer. So, if the month of December is selected in the first layer, the second layer includes numbers 1-31 to represent each of the days in the month of December. The examples discussed herein are simplified to promote an easier understanding of the basic concepts disclosed herein. It should be understood by those of ordinary skill in the art that more complex user options can be provided in accordance with the present disclosure.

In one embodiment, a layer can be based upon multiple data inputs with dependencies across multiple data inputs, and a terminal-related choice can be provided along the choice pathway. When using multiple layers with multiple data input fiends, user choices can be interdependent and step-wise to a larger descriptive piece of data. For example, in a vascular surgery environment, a user choice can indicate an incision with a numerical value into a superficial vein or artery and additional choices that traverse that vascular pathway, leading to a point where a stint (a type of surgical balloon) should be inflated and also associated with some quantitative value.

At step 404, the menu 310 is then generated by the processor 214 and displayed with the user options 305 on a visual display 216. The menu 310 is generated such that it contains a menu field 315 for each of the user options 305 determined in step 402, and is displayed such that each menu field 315 contains one of the user options 305 and is positioned circumferentially around a point of origin located at or near the cursor 302. It should be appreciated that additional user options other than those discussed herein may be displayed. For example, an "exit" option may be provided to allow the user to close the menu 310.

At step 406, the processor 214 receives vector data indicative of a displacement angle and a displacement distance of the cursor 302. The vector data is generated when the user moves the cursor 302 and is analyzed, as discussed below, to determine whether the user selected one of the displayed user options 305. Generally, the user selects one of the displayed user options 305 by moving the cursor 302 in the direction of the user option 305 that the user wishes to select. The vector data may include: speed data, angle data, acceleration data, and Euclidean distance data. The speed data provides a measurement of the speed at which the user moves the cursor 302. The angle data provides a measurement of the displacement angle, which is the angle at which the cursor 302 is moved with respect to the point of origin of the menu 310 (or with respect to the position of the cursor 302 upon display of the menu 310 at step 404). The acceleration data provides a measurement of the acceleration of the cursor 302 as the user moves the cursor 302. Finally, the Euclidean distance data provides a measurement of the displacement distance, which is the distance between the position of the cursor 302 and the point of origin (or the distance between the position of the cursor 302 upon display of the menu 310 and the final resting position of the cursor 302 after the user has moved the cursor 302).

The processor 214 can receive various types of parametric data other than the vector data. For example, the parametric data may include time displacement and/or elapsed time data. The time displacement and/or elapsed time data can be used in addition to speed data, in the place of speed data, or in the calculation of a speed. Velocity is a function of distance and time, so the displacement and/or elapsed time data can be used with the other parametric data to determine the velocity of the cursor movement.

Figure 6:
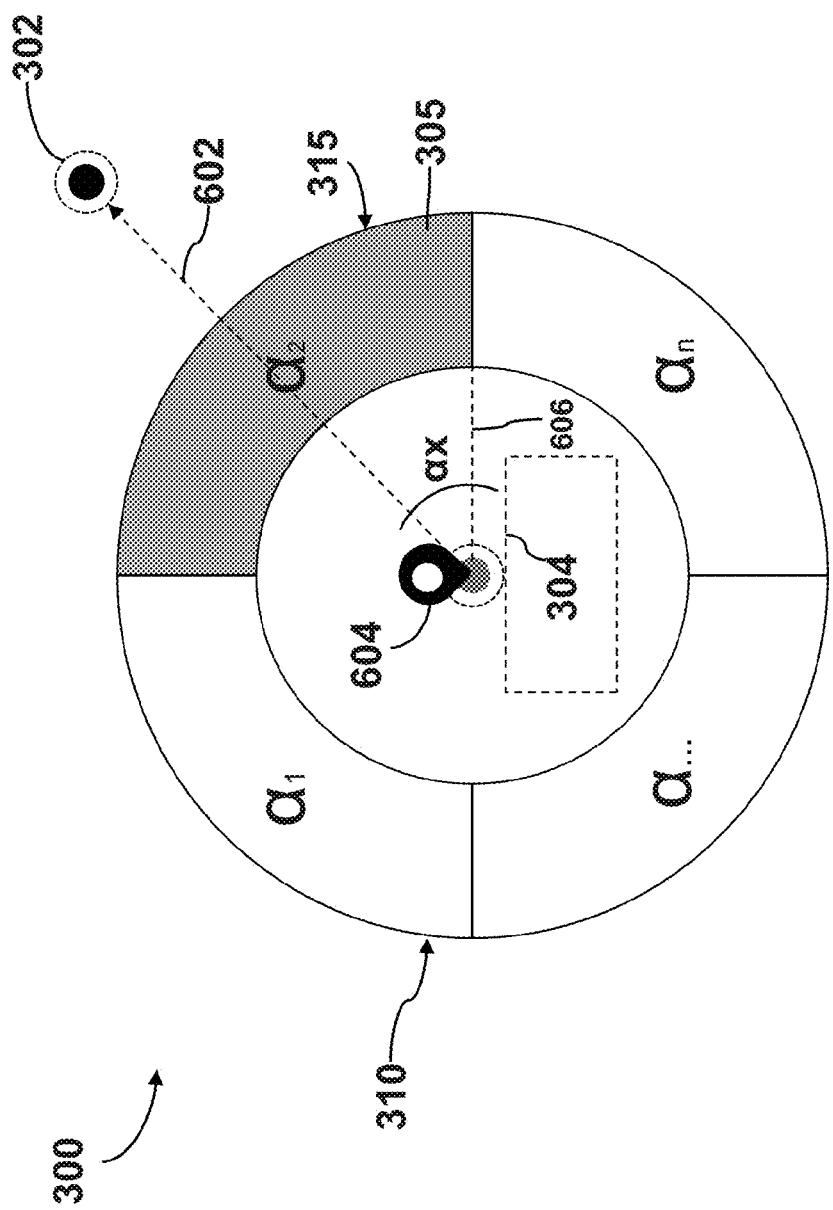
FIG. 6 illustrates an example of the GUI in an embodiment wherein a user selects one of the displayed user options from the menu.

Referring briefly to FIG. 6, an example of the GUI 300 is shown to illustrate a user making a selection of displayed user option α2. In the example shown in FIG. 6, the user moves the cursor 302, as illustrated by vector 602, in the direction of user option α2. A marker 604 is provided to illustrate the point of origin of the menu 310, which, in this example, is also the starting location of the cursor 302 prior to its movement. The vector data is received by the processor 214 as the user moves the cursor 302. For example, the speed data indicates the speed at which the cursor 302 moved along the vector 602. The angle data indicates the displacement angle at which the cursor 302 is moved from the marker 604 (shown in this embodiment with respect to an orientation axis 6)6). The displacement angle is illustrated in FIG. 6 as angle $\alpha_x$. Acceleration data indicates the acceleration of the cursor 302 along the vector 602. Finally, Euclidean distance data. Indicates the displacement distance of the cursor 302, which is the length of vector 602 as measured from the marker 604 to the final resting position of the cursor 302. As discussed below, this vector data is used to determine whether the user selected a displayed user option 305, and if so, which of the displayed user options 305 was selected.

Step 408 of FIG. 4 is now discussed with reference to FIG. 6. Once the vector data is received by the processor 214, the processor 214 determines, at step 408, whether the vector data indicates the user selected one of the displayed user options 305. In some embodiments, this may include the processor 214 comparing the vector data to coordinate data associated with the locations of the menu fields/user options 315/305. As should be understood by one of ordinary skill in the art, the vector data indicates the direction and distance the cursor 302 was moved by the user at step 406. The processor 214 uses this information to determine whether the vector data generated by the user moving the cursor 302 indicates that the cursor 302 was moved across any of the displayed user options 305 or their corresponding menu field 315. This may include comparing coordinate data corresponding to the locations of the displayed menu fields/user options 315/305 to the vector data to determine whether the vector 602 (represented by the combination of the cursor displacement distance and displacement angle $\alpha_x$) intersects any of the coordinates associated with any of the displayed menu fields/user options 315/305. If the vector 602 intersects any of the coordinates associated with the location of any of the displayed menu fields/user options 315/305, then the processor 214 determines that the user selected a displayed user option 305, specifically, the user option 305 corresponding to the coordinate data intersected by the vector 602. In the example illustrated in FIG. 6, the processor 214 may determine from the vector data that user option α2 was selected because the vector 602 intersects user option α2.

In some embodiments, depending upon various factors such as the specific user option 305 selected or the specific data input field 304, additional vector data may be analyzed by the processor 214 to determine additional information. For example, if the data input field 304 is a number and the selected user option 305 is a number range, the speed and/or acceleration data may be analyzed by the processor 214 to determine how the user is intending to interact with the number range presented by the selected user option 305. For example, if the acceleration data indicates a rapid acceleration of the cursor 302, the processor 214 may determine the user intends to skip through large sections of the number range. Thus, if the number range begins in single digits, the processor 214 may determine from a rapid acceleration of the cursor 302 that the user is intending a large number range such as in the hundreds. Similarly, the processor 214 may analyze the speed data to determine how quickly the user is intending to traverse the number range. If the speed data indicates slow movement of the cursor 302, the processor 214 may determine that the user is intending to move slowly through the number range. Conversely, if the speed data indicates fast movement of the cursor 302, the processor 214 may determine that the user is intending to move quickly through the number range. The processor 214 may use this information to interpret the intent of the user and to display the proper information to the user using the menu 310 in accordance with the present disclosure.

Referring again to FIG. 4, if the processor 214 determines a user did not select any of the displayed user options at step 408, the processor 214 waits to receive additional input (e.g., additional vector data). If, however, the processor 214 determines a user did select one of the displayed user options 315, the processor 214 executes the selected user option 305 at step 410. The graphical user interface can have a conditional exit if the cursor or touch input is released within the inner loop of the menu, unless it presents a multi-staged modification where a terminal or exit option may be used.

In some embodiments, the selected user option 305 may invoke a modification to the data input field 304, the input data, the menu 310, or any combination thereof. In some embodiments, the processor 214 may determine from the data table stored in memory 212 that the selected user option 305 invokes a modification to the input data or the data input field 304 because no subsequent layers or user options are associated with the selected user option 305. As discussed herein, modifying the data. Input field 304 includes at least one of: (i) providing new input data that is associated with the data input field 304, and (ii) modifying existing input data that is associated with the data input field 304. For example, if the data input field 304 is empty, and the selected user option 305 is a month, then the processor 214 modifies the data input field 304 by adding input data that represents the specific month that was selected by the user. As another example, if the data input field 304 already includes input data, say a first month, then modifying the data input field 304 may include replacing the original input data (the first month) with new input data indicating a different month. It should be appreciated that modifying the input data field 304 could include many other options other than replacing existing input data. For example, the modification of the input data could include formatting the input data. (e.g., highlighting, italicizing, underlining, etc.), or other ways of modifying the existing input data. In a medical context, modifying existing input data could include, for example, adding or removing portions of a modeled body part.

In some instances, executing the selected user option 305 invokes a modification to the menu 310. For example, the processor 214 may determine, in some embodiments, from a data table stored in memory 212 that the selected user option 305 is a "submenu" that compels additional user input because the selected user option 305 is associated with a subsequent layer in the data table that contains additional user options. In such instances, the processor 214 may modify the menu 310 to display these additional user options that are associated with the "submenu" user option 305 selected by the user. In one embodiment, a plurality of changes to an input field can trigger a submenu. For example, clicking (e.g., selecting with a cursor) a data input field multiple times or clicking a first data input field and then clicking a second input field can present a submenu or options specific to that order. The processor 214 then returns to step 406 to receive vector data.

Figure 7A:
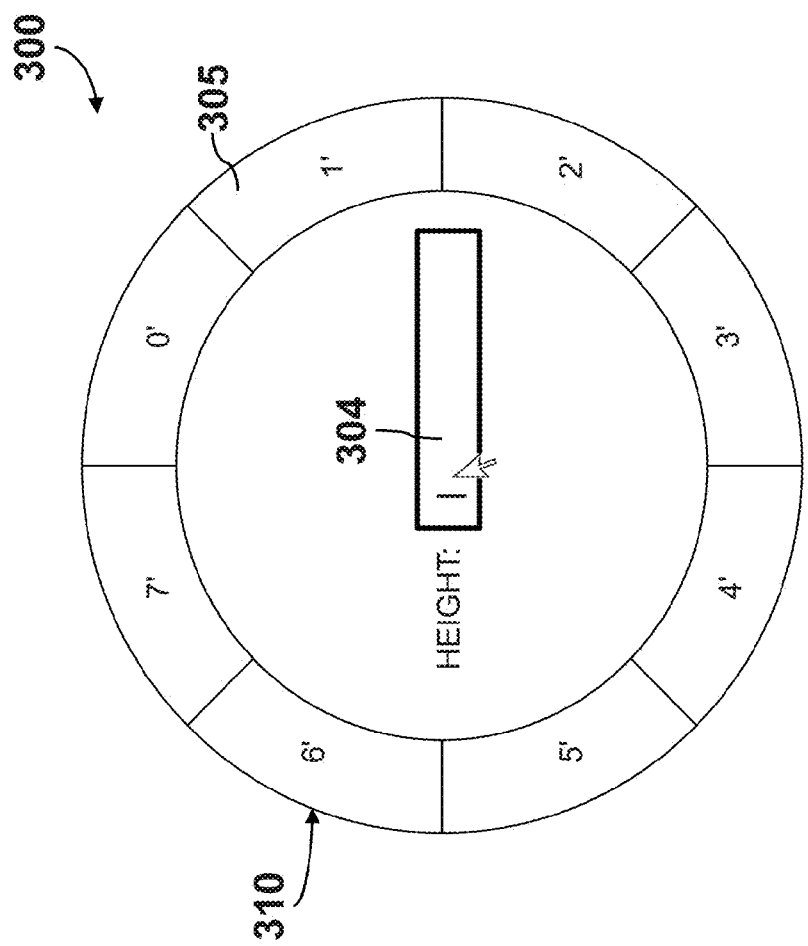
FIGS. 7A and 7B illustrate an example embodiment in accordance with the present disclosure wherein original user options displayed in the menu are replaced with different user options.
Figure 7B:
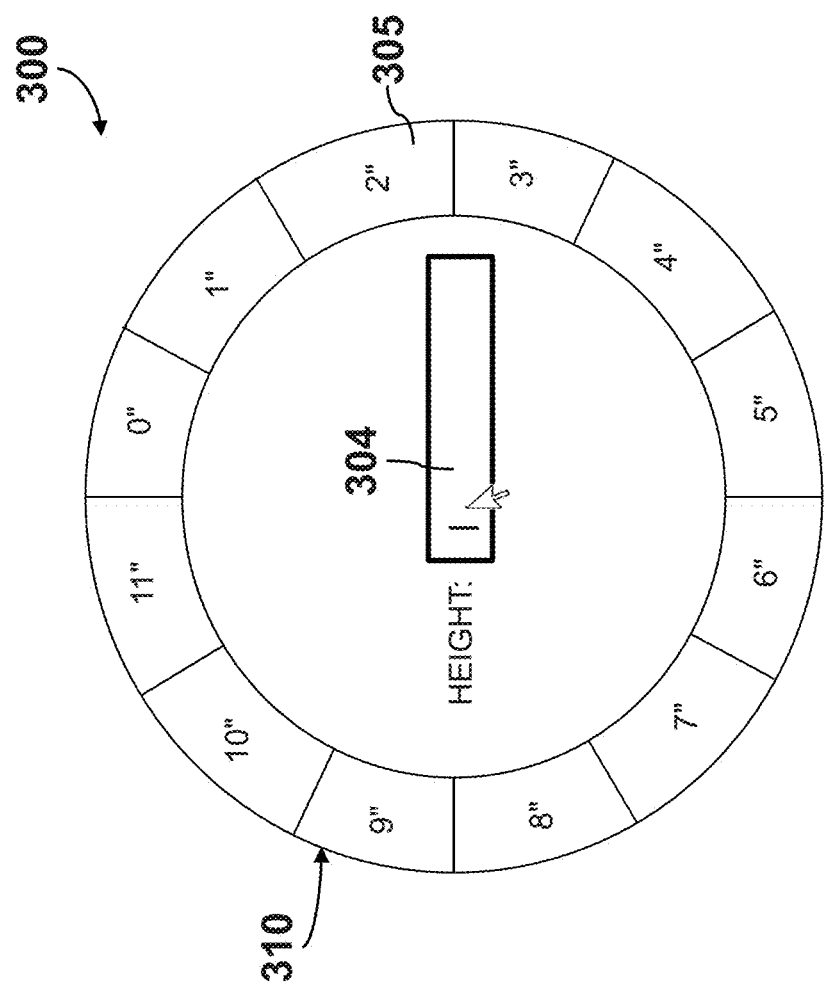

The modification to the menu 310 may be accomplished in a variety of ways. For example, in one embodiment, the user options 305 displayed by the menu 310 may be replaced with different user options. This embodiment is illustrated in FIGS. 7A and 7B, wherein FIG. 7A illustrates a GUI 300 showing the menu 310 having the original user options 305, and FIG. 7B illustrates the menu 310 having different, updated user options 705.

In accordance with an embodiment of the present disclosure, the updated user options 705 are typically associated with the original user option 305 that was selected by the user, the data input field 304, or both. In the embodiment illustrated in FIGS. 7A and 7B, the data input field 304 is a patient's height, the original user options 305 are numbers representing feet, and the updated user options 705 are numbers indicating inches. Collectively, the GUI 300 illustrated in FIGS. 7A and 7B provides an interface for inputting a patient's height. By updating the displayed user options, the menu 310 provided by the GUI 300 adapts in accordance with the information that is required for the data input field 304 and in accordance with the user options 305, 705 that are selected by the user.

Figure 8A:
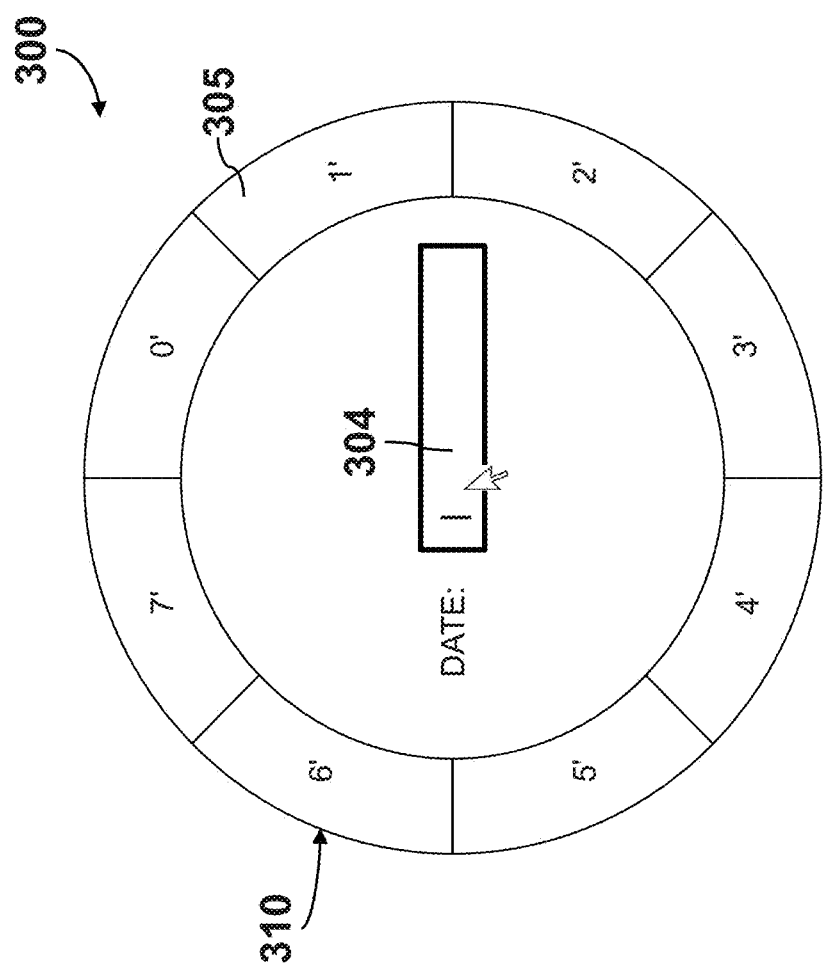
FIGS. 8A and 8B illustrate an example embodiment in accordance with the present disclosure wherein the menu is modified to include new user options displayed around at least a portion of the perimeter of the original user options.
Figure 8B:
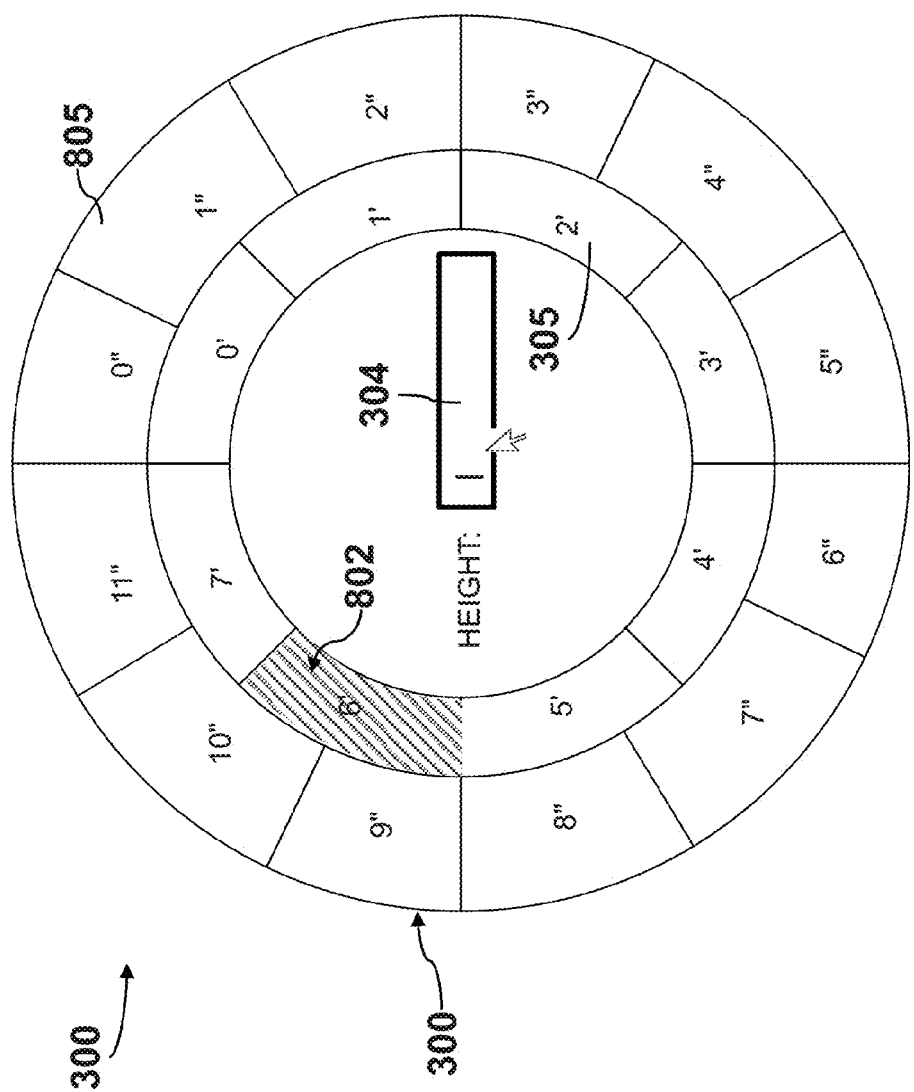

As another example, the menu 310 may be modified to include additional user options that are displayed around the original user options 305. This embodiment is illustrated in FIGS. 8A and 8B, wherein FIG. 8A illustrates the GUI 300 having a menu 310 with original user options 305, and FIG. 8B illustrates the GUI 300 having a menu 310 as modified to include additional user options 805 displayed around at least a portion of the perimeter of the original user options 305. In this embodiment, the original user option 305 that was selected by the user may be modified (shown here as being highlighted 802) to indicate which specific original user option 305 was selected.

Again, in accordance with some embodiments of the present disclosure, the updated user options 805 are typically associated with the original user option 305 that was selected by the user, the data input field 304, or both. In the embodiment illustrated in FIG. 8B, the data input field 304 is a patient's height, the original user options 305 are numbers representing feet, and the updated user options 805 are numbers indicating inches. Collectively, the GUI 300 illustrated in FIGS. 8A and 8B provides an interface for inputting a patient's height. The GUI 300 and menu 310 adapt in accordance with the information that is required for the data input field 304 and in accordance with the user options 305, 805 that are selected by the user. In this specific embodiment, however, instead of replacing the original user options 305, the GUI 300 adapts to the selected user option 305 by adding additional user options 805 to the menu 310, and indicating the selected original user option 305 via highlighting 802.

As previously mentioned, once the menu 310 is updated, the processor 214 returns to step 406 to receive vector data. This process repeats until the data entry process is completed or is otherwise terminated.

Figure 9:
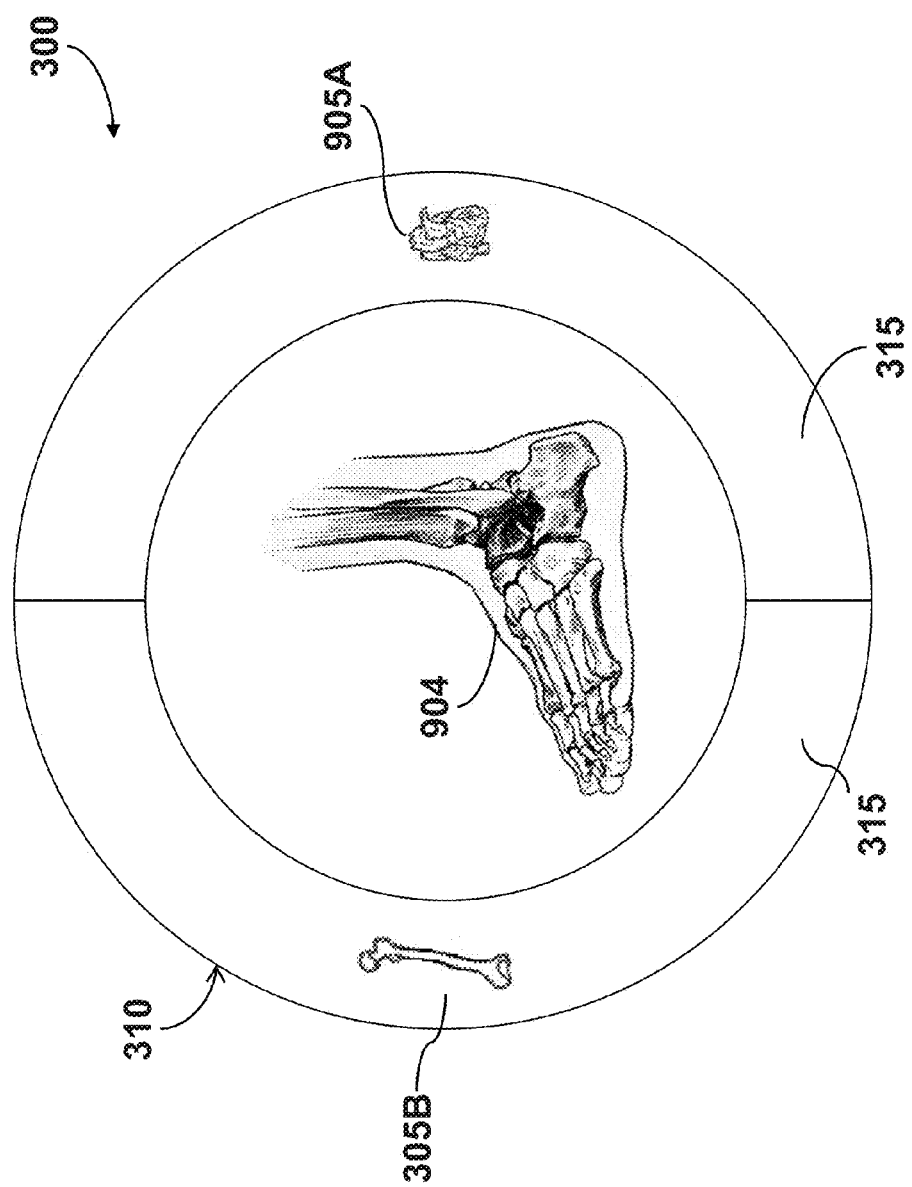
FIG. 9 illustrates an embodiment of the disclosed adaptive control and annotation GUI wherein the displayed user options are presented in a graphical representation.

As referenced throughout the present disclosure, the disclosed GUI may be presented in a manner such that the menu provides user options that are displayed to a user in a graphical representation. FIG. 9 illustrates such an embodiment of the disclosed adaptive and control annotation GUI 300 wherein the displayed user options are presented in a graphical representation. Although various embodiments disclosed herein, including the embodiment illustrated in FIG. 9, relate to a medical context, it should be understood that the disclosed adaptive control and annotation GUI is not in any way limited to a medical context, but may be implemented in any conceivable user interface.

As shown in FIG. 9, the GUI 300 includes a menu 310 comprising two menu fields 315, wherein each menu field 315 includes one user option 905 displayed in a graphical representation (as opposed to a textual representation). In the embodiment illustrated in FIG. 9, the data input field 904 is a patient's foot, a first graphical user option 905A is illustrated as a heart, and a second graphical user option 905B is illustrated as a bone. In this embodiment the heart-shaped graphical user option 905A may represent a user option relating to the circulatory system of the patient's foot, and the bone-shaped graphical user option 905B may represent a user option relating to the bones comprising the foot. When compared to a textual implementation, the graphical representation may offer the added benefits of being more intuitive to the user and easier to comprehend and navigate for a variety of reasons. For example, the graphical representation does not require the user to read the user option, nor does it require the user to be able to read a particular language to comprehend the user option.

The foregoing method descriptions and the process flow diagrams are provided merely as illustrative examples and are not intended to require or imply that the steps of the various embodiments must he performed in the order presented. The steps in the foregoing embodiments may be performed in any order, Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be rearranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or the like, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory, processor-readable storage media may be any available media that may be accessed by a computer. By way of example, and not limitation, such non-transitory, processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for modifying a graphical user interface, the method comprising:
   identifying, by a computer, a data input field based on coordinates of pixels associated with a location of a cursor on the graphical user interface;
   determining, by the computer, one or more user options associated with the identified data input field;
   displaying, by the computer, a context-sensitive menu comprising the one or more user options positioned circumferentially around a point of origin located proximate to the cursor, the one or more user options being based on contextual information relevant to the identified data input field, the context-sensitive menu being rendered to encircle the identified data input field in a manner permitting contents of the identified data input field to be viewable with the graphical user interface;
   receiving, by the computer, parametric data comprising vector data indicative of a displacement angle and displacement distance of the cursor with respect to the point of origin;

determining, by the computer, whether one of the displayed user options was selected by a user, the determination based on the vector data; and based on determining that one of the displayed user options was selected by the user, executing, by the computer, the selected user option to modify, by the computer, the identified data input field encircled by the context-sensitive menu in accordance with the displayed user option selected by the user.

2. The computer-implemented method of claim 1, wherein the parametric data further comprises a timed displacement of the cursor with respect to the point of origin.

3. The computer-implemented method of claim 1, wherein determining whether one of the displayed user options was selected by the user comprises:
   comparing, by the computer, the vector data to coordinates associated with locations of the one or more user options displayed in the menu; and
   determining, by the computer, whether the vector data intersects the coordinates associated with the location of one of the displayed user options.

4. The computer-implemented method of claim 1, wherein modifying, by the computer, the identified data input field in accordance with the displayed user option selected by the user comprises at least one of: (i) providing input data associated with the data input field, and (ii) modifying input data associated with the data input field.

5. The computer-implemented method of claim 1, wherein executing the selected user option comprises modifying, by the computer, the menu to display one or more updated user options, wherein the updated user options displayed in the menu are determined based on the displayed user option selected by the user.

6. The computer-implemented method of claim 1, wherein determining, by the computer, the one or more user options associated with the identified data input field comprises accessing, by the computer, a database containing a data table of user options associated with the identified data input field.

7. The computer-implemented method of claim 1, wherein the parametric data is indicative of an acceleration measurement of the cursor displacement.

8. The computer-implemented method of claim 1, wherein displaying the context-sensitive menu around a point of origin located proximate to the cursor comprises displaying the context sensitive menu around the identified data input field.

9. A computer-implemented method for modifying a graphical user interface, the method comprising:
   identifying, by a computer, a data input field based on a location of a cursor on the graphical user interface;
   determining, by the computer, one or more user options associated with the identified data input field based on contextual information of the location of the cursor and the graphical user interface;
   displaying, by the computer, a context-sensitive menu comprising the one or more user options positioned circumferentially around a point of origin located proximate to the cursor, the one or more user options being based on contextual information relevant to the identified data input field, the context-sensitive menu being rendered to encircle the identified data input field in a manner permitting contents of the identified data input field to be viewable with the graphical user interface;
   receiving, at the computer, parametric data comprising vector data indicative of a displacement angle and displacement distance of the cursor with respect to a location of the cursor when the menu is displayed;
   determining, by the computer, whether one of the user options contained in one of the menu fields was selected by a user, the determination based on the vector data; and
   based on determining that one of the user options contained in one of the menu fields was selected by the user, executing, by the computer, the selected user option to modify, by the computer, the identified data input field encircled by the context-sensitive menu in accordance with the displayed user option selected by the user.

10. The computer-implemented method of claim 9, wherein the parametric data further comprises a timed displacement of the cursor with respect to the point of origin.

11. The computer-implemented method of claim 9, wherein determining whether one of the user options contained in one of the menu fields was selected by the user comprises:
    comparing, by the computer, the vector data to coordinates associated with locations of the one or more menu fields displayed in the menu; and
    determining, by the computer, whether the vector data intersects the coordinates associated with the location of one of the displayed menu fields.

12. The computer-implemented method of claim 9, wherein modifying, by the computer, the identified data input field in accordance with the user option contained in the menu field selected by the user comprises at least one of: (i) providing input data associated with the data input field, and (ii) modifying input data associated with the data input field.

13. The computer-implemented method of claim 9, wherein executing the selected user option comprises modifying, by the computer, the menu to display the one or more menu fields each containing an updated user option, wherein the updated user options contained in the menu fields are determined based on the displayed user option selected by the user.

14. The computer-implemented method of claim 9, wherein determining, by the computer, the one or more user options associated with the identified data input field comprises accessing, by the computer, a database containing a data table of user options associated with the identified data input field.

15. The computer-implemented method of claim 9, wherein the parametric data is indicative of an acceleration measurement of the cursor displacement.

16. A system comprising:
   a computer configured to execute one or more graphical user interfaces corresponding to one or more records of data input fields and one or more records of user options in a data store, wherein executing the one or more graphical user interfaces comprises:
      identifying, by the computer, one of the data input fields based on coordinates of pixels associated with a location of a cursor,
      determining, by the computer, the one or more user options associated with the identified data input field,
      executing, by the computer, one of the graphical user interfaces to display a context-sensitive menu comprising the one or more user options associated with and relevant to the identified data input field, wherein the one or more user options are displayed circumferentially around a point of origin located proximate to the cursor and the context-sensitive menu being rendered to encircle the identified data input field in a manner permitting contents of the identified data input field to be viewable with the graphical user interface;

receiving, by the computer, vector data indicative of a displacement angle and displacement distance of the cursor with respect to the point of origin;

determining, by the computer, whether one of the displayed user options was selected by a user, the determination based on the vector data; and based on determining that one of the displayed user options was selected by the user, executing, by the computer, the selected user option to modify the identified data input field encircled by the context-sensitive menu in accordance with the displayed user option selected by the user.

17. The system of claim 16, wherein determining whether one of the displayed user options was selected by the user comprises:

comparing the vector data to coordinates associated with locations of the one or more user options displayed in the menu; and determining whether the vector data intersects the coordinates associated with the location of one of the displayed user options.

18. The system of claim 16, wherein the database is further configured to store one or more records of input data associated with the identified data input field, and wherein modifying the identified data input field in accordance with the displayed user option selected by the user comprises:

retrieving, from the database, input data associated with the data input field, and modifying the data input field to include the input data.

19. The system of claim 16, wherein the database is further configured to store one or more records of input data associated with the identified data input field, and wherein modifying the identified data input field in accordance with the displayed user option selected by the user comprises modifying the input data associated with the data input field.

20. The system claim 16, wherein executing the selected user option comprises executing one of the graphical user interfaces such that the menu displays one or more updated user options, wherein the updated user options displayed in the menu are determined based on the displayed user option selected by the user.

* * * * *